United States Patent [19]

Halftown et al.

[11] Patent Number: 5,449,318

[45] Date of Patent: Sep. 12, 1995

[54] REGENERATED FOOD CASING HAVING FOOD RELEASE PROPERTIES DUE TO AN INTERNAL SURFACE COMPRISING VISCOSE WITH PEG

[75] Inventors: John J. Halftown, Covington, Ind.; Douglas E. Appleby, Danville, Ill.; Marc J. Vrijsen, Zonhoven, Belgium

[73] Assignee: Teepak, Inc., Westchester, Ill.

[21] Appl. No.: 287,346

[22] Filed: Aug. 8, 1994

[51] Int. Cl.⁶ .............................................. A22C 13/00
[52] U.S. Cl. ........................................ 452/50; 452/27; 426/420; 264/187; 138/118.1; 106/168
[58] Field of Search ................... 452/50, 27, 35; 426/420, 105; 428/36, 220, 34.8; 138/118.1; 106/168

[56] References Cited

U.S. PATENT DOCUMENTS

| | | | |
|---|---|---|---|
| 2,709,138 | 5/1955 | Weingaud | 99/176 |
| 2,901,358 | 8/1959 | Underwood | 99/176 |
| 3,106,471 | 10/1963 | Firth | 99/109 |
| 3,656,993 | 4/1972 | Edwards et al. | 117/56 |
| 3,670,697 | 6/1972 | Kindl et al. | 118/408 |
| 3,843,378 | 10/1974 | Smith | 106/168 |
| 3,887,713 | 6/1975 | Rasmussen | 426/135 |
| 3,896,764 | 7/1975 | Kindl et al. | 118/408 |
| 3,898,348 | 8/1975 | Chiu et al. | 426/413 |
| 4,062,981 | 12/1977 | Bridgeford | 426/278 |
| 4,137,947 | 2/1979 | Bridgeford | 138/118.1 |
| 4,198,325 | 4/1980 | Hammer et al. | 260/17.3 |
| 4,221,821 | 9/1980 | Hammer et al. | 426/420 |
| 4,390,490 | 6/1983 | Martinek et al. | 264/173 |
| 4,489,114 | 12/1984 | Bridgeford | 428/36 |
| 4,514,472 | 4/1985 | Vrouenraets | 428/420 |
| 4,844,129 | 7/1989 | Bridgeford et al. | 138/118.1 |
| 5,199,465 | 4/1993 | Stiem | 138/118.1 |
| 5,277,857 | 1/1994 | Nicholson et al. | 264/187 |

FOREIGN PATENT DOCUMENTS

0559456A1 9/1993 European Pat. Off. .
7928639 11/1979 France .

OTHER PUBLICATIONS

Abstract–RO 96255.
Hoechst Aktiengesellschaft 2,654,427, Kalle Subsidiary of Hoechst AG, Wiesbaden, Biebrich, Sep., 1976.
Nippon Kagaku Kaishi, The Chemical Society of Japan, 7, pp. 1106–1110 (1988).
Priest, Article entitled "The Accessibility of Plasticised Cellulose Films", pp. 50–53 (1968).
Lyubova et al., "Use of High-Molecular-Weight Polyethylene Glycol in the Production of High-Tenacity Rayon Cord", Translated from Khimicheskie Volokna No. 4, pp. 65–66, Jul.–Aug., 1977, pp. 402–404.
Abstract–U.S. Pat. No. 4,576,646.
Abstract–U.S. Pat. No. 4,221,821.
Abstract–U.S. Pat. No. 4,072,785.
Abstract–SU 939605.

*Primary Examiner*—Willis Little
*Attorney, Agent, or Firm*—Michael L. Dunn

[57] ABSTRACT

A cellulose food casing which can be peeled from food product contained therein without damaging said food product, said food casing having an internal surface composition comprising regenerated viscose containing polyalkylene glycol having a molecular weight of from 300 to 20,000. The invention further includes such food casings in fibrous form wherein only the internal layer of viscose contains polyalkylene glycol and the method for making such casings.

8 Claims, No Drawings

REGENERATED FOOD CASING HAVING FOOD RELEASE PROPERTIES DUE TO AN INTERNAL SURFACE COMPRISING VISCOSE WITH PEG

BACKGROUND OF THE INVENTION

This invention relates to food casings having the property of being easily removed from food contained therein without damaging the contained food product.

Food casings employed in the processed food industry range from generally thin walled, small diameter sizes, such as for frankfurters, to thicker walled, fibrous reinforced, large diameter type casings, such as for bologna. Food casings in the form of tubes have multiple uses in that they may be employed as packaging during processing of the foodstuff encased inside, and also as protective wrappings for finished product.

In the sausage meat industry, regardless of the size of the product, part of the processing usually requires removal of the casing from the processed meat prior to final packaging or consumption. This is also true with respect to some other foods, such as certain processed cheeses, Peeling casing from processed foods, such as sausages, has presented significant problems, especially in the production of skinless frankfurters where large output is involved and efficient commercial operations require high speed automatic stuffing and peeling machines. When casings are peeled from meat, there can be a tendency for some of the meat to adhere to the casing film and be torn from the sausage within the casing. This causes loss of meat and marring of the surface of the sausage product. Such products either may not be salable, which means higher production cost, or, if offered for sale, there is usually reduced customer acceptance due to poor appearance.

In other instances, portions of the casing may not be removed at all by the machine which then requires manual intervention with resulting increased costs and reduced rate of production. In remedying the problem of casing adherence to foodstuff, several release coating compositions have been suggested for application to the interior wall of the casing for improved peelability. A few representative examples include U.S. Pat. No. 2,709,138 which discloses an internal release coating of a fatty isocyanate; U.S. Pat. No. 3,106,471 relates to release coatings of fatty ketenes; U.S. Pat. No. 2,901,358 discloses the use of a chromic chloride compound containing composition, and U.S. Pat. No. 4,062,981 teaches a water dispersible non-ionic surfactant such as sorbitan trioleate. In addition release coatings have been described which contain a water soluble cellulose ether, e.g. as described in U.S. Pat. Nos. 3,898,348 and 4,137,947. Water soluble polysaccharides have been suggested in release coatings usually in combination with a cellulose ether and a polyalkylene glycol ether.

Such know release coatings have suffered from certain disadvantages. One of the major disadvantages is that coating compositions must be prepared with precise ratios of components or there is a significant risk of poor performance. Another disadvantage is that the coating composition must be uniformly applied at a narrow range of volume per unit are of food casing. Still another problem is that the efficacy of such coatings tend to deteriorate with time. And still another problem associated with such coatings is that when casing is soaked prior to stuffing, components of the coating tend to leach from the casing altering the efficacy of the coating. This is true whether the moisture is applied by the casing manufacturer (premoisturized casing) or is applied by the meat packer. Further, known meat release coatings have had another deficiency in that the properties imparted by such coatings have had to be balanced with other desired properties of the food casing such as flexibility, strength and freedom from deterioration of the casing itself.

There is therefore a need for a unique type of release mechanism which overcomes the disadvantages previously described.

Numerous patents have been published worldwide which disclose the use of polyethylene oxide in viscose to stabilize fibers from regenerated cellulose (rayon fibers). Such additions have not been made to food casings made from regenerated cellulose, since it has not been perceived that the type of stabilization required for fibers had any application to sausage casings and further, except as noted subsequently, no advantage to adding polyalkylene glycol to viscose for the manufacture of food casing was recognized.

U.S. Pat. No. 4,198,325 discloses some effect of an N-methylol carbamate terminated polyoxyalkylene compound as a plasticizer when added to viscose in conjunction with a monocarboxylic acid-polyol ester. The addition of unmodified or otherwise modified polyalkylene glycol is not suggested for any purpose.

European Published Patent Application discloses the addition of high molecular weight (70,000 or greater) olefinic oxide to viscose for internally plasticizing film formed from the viscose to obtain various advantages. It is suggested that such addition could assist the peeling characteristics of a food casing made from the resulting regenerated cellulose. Such improvement in peeling characteristics is not nearly as good as desired. The above European Patent Application further indicates that lower molecular weight polyalkylene oxides, especially those of molecular weight 20,000 or lower, are unsuitable for addition to viscose because of leaching and reduction in product strength.

BRIEF DESCRIPTION OF THE INVENTION

In accordance with the invention there is therefore provided a cellulose food casing which can be peeled from food product contained therein without damaging said food product, said food casing having an internal surface composition comprising regenerated viscose containing from 0.1 to 30 percent, preferably 0.2 to 25 percent and most preferably 0.25 to 20 percent, by weight of cellulose, of polyalkylene glycol having a molecular weight of from 300 to 20,000 and preferably from 500 to 15,000 and most preferably from 1000 to 10,000.

The polyalkylene glycol is commonly present in fibrous type casing as an integral part of the internal regenerated cellulose surface in an amount of from 0.1 to 2 percent and commonly has a molecular weight of from 1,000 to 15,000 and for most types of casing is preferably water soluble.

The polyalkylene glycol preferably has the formula $H(OCH_2\text{-}CH_2)_n OH$ wherein n is an integer of from 10 to 400.

The polyalkylene glycol is usually polyethylene glycol (PEG).

The internal surface may be an internal layer containing the polyalkylene glycol upon a balance of the film comprising a standard regenerated viscose with or without polyalkylene glycol. It is to be understood that "internal layer" does not exclude the embodiment wherein the entire food casing has the same composition throughout. In the case of a fibrous type sausage casing wherein viscose is applied to a cellulose fiber web, usually in the form of a paper, formed into the shape of a tube, a viscose containing polyalkylene oxide in accordance with the invention may be applied to the inside of the tube while viscose without polyalkylene oxide is applied to the outside of the tube.

DETAILED DESCRIPTION OF THE INVENTION

Cellulose food casing, as used herein, means essentially any food casing containing a significant portion, i.e. greater than 50%, cellulose, regenerated from viscose. While the preferred viscose is xanthate type viscose, it is to be understood that other viscoses having similar characteristics are included, e.g. aminomethanate viscose (also known as carbamate or aminomethanate viscose and cupraammonium type viscose). Such food casings may be unreinforced, i.e. include no reinforcing fiber, or may be reinforced with fiber, usually with cellulose fiber in the form of non-woven sheet or mat. Such fiber reinforcing is typically a paper made from a strong natural cellulose fiber such as hemp but may be a regenerated cellulose fiber in the form of rayon or may be other natural or synthetic fiber. It is to be understood that woven sheets or mats from such fibers may also be used but are usually not preferred because non-woven products are usually give satisfactory performance at lower cost. All of such fiber reinforced food casing products may be referred to herein as "fibrous" casing.

Fibrous casing is particularly suited for manufacture of the products of the invention. Fibrous casing is formed by shaping a fiber sheet or mat into the form of a tube having overlapping edges followed by impregnating the sheet or mat with viscose. When the viscose is regenerated by known methods, the resulting regenerated cellulose adheres and seals the edges to form a seam and the fibers add significant strength to the regenerated cellulose product. In newer approaches to impregnating the fiber mat with viscose, the viscose is applied to both the inside and outside of the tube through different orifices. Such methods are described in U.S. Pat. Nos. 3,670,697; 3,896,764 and 4,390,490.

When such methods are used, a layer of viscose can be easily applied to the inside of the tube which has a different composition than the layer of viscose applied to the outside of the tube. This is particularly advantageous since, in accordance with the present invention, a relatively high percentage of low molecular weight polyalkylene glycol can be incorporated into the viscose applied to form the inside layer but not into the viscose applied to the form the outside layer, to obtain a release inside layer without significantly affecting other desirable properties of the casing.

The polyalkylene glycol incorporated into the viscose preferably has a molecular weight of at least 300, preferably at least 500 and most preferably at least 1000. Lower molecular weights tend to migrate too readily from the casing and tend to adversely affect the strength properties of the casing. However, the molecular weight should not exceed 20,000, preferably not exceed 15,000 and most preferably not exceed 10,000. It is believed that release properties of the casing of the invention are at least partly due to slow migration of the polyalkylene glycol to the surface of the casing and that higher molecular weights do not migrate as well as desired for that purpose.

It is to be understood that higher molecular weights can be used, particularly when the casing is a fibrous casing, since higher concentrations of high molecular weight material can be used when the polyalkylene glycol is applied only to an inside layer without significantly altering the overall strength properties of the casing.

In general for fibrous type casing, the polyalkylene glycol is incorporated into the viscose in an amount of at least 0.1 and preferably at least 0.25 percent by weight of total cellulose solids. Minimum addition for nonreinforced cellulose casing are usually higher, e.g., at least 5 percent. Lower additions are not believed to give sufficient release characteristics. For most casings, including unreinforced cellulose, the polyalkylene glycol should usually not be incorporated into the viscose in a quantity above 30 percent, preferably not above 25 percent and most preferably at a level not above 20 percent.

The polyalkylene glycol is preferably polyethylene glycol or other lower alkylene glycols which should be water soluble. The preferred polyalkylene glycol has the formula $H(OCH_2\text{-}CH_2)_nOH$ wherein n is at least 10 and preferably at least 30 but is usually not more than 400 and preferably not more than 300.

The following examples serve to illustrate and not limit the present invention.

EXAMPLE 1

110 grams of polyethylene glycol having an average molecular weight of about 8,000 was dissolved in 50 liters of water resulting in a 0.22% solution. This solution was injected into the viscose flow, being applied to the inside of a fibrous web in the shape of a tube, at solution flow rates of 50 ml and 150 ml per minute. The resulting concentrations in the inside viscose are 0.35 and 1.0 percent based upon cellulose content. The size of the casing was a code 0600T which has a flat width of about 143.5 mm. After regeneration, the casing was stuffed with food product which was cooked in the casing. The casing was then tested for its ability to be peeled from the casing without damaging the food product. In the case of sausage food product, the casing peeled with excellent results. In the case of cheese product from which peeling is more difficult, peeling would have been satisfactory except for small very shallow spots of food product removal with the casing which would not have been readily noticed except that the cheese product had a smoke colored surface and the small spot removal exposed the underlying cheese color.

EXAMPLE 2

A standard viscose unreinforced sausage casing was manufactured using procedures know to those skilled in the art wherein viscose was extruded through a die to form a tubular shape and regenerated in a bath to form a regenerated cellulose tube. The size of the casing formed was a code 23 which has a flat width of about 31.25 mm at a BDG (bone dry gauge, solids) of 18.1 grams of cellulose per 10 meters at a forming speed of 118 feet per minute. The amount of viscose required at 7.7% cellulose solids was 761 cc/minute or 65 grams of cellulose solids per minute.

EXAMPLE 3

A sausage casing was prepared as in Example 2 except that the viscose was modified by adding 41 cc/minute of an aqueous solution containing 30 weight percent of polyethylene glycol having an average molecular weight of about 4,000 to the viscose. The resulting modified viscose was still used at the standard flow rate of 761 cc/minute comprising 720 cc/minute of original 7.7% cellulose solids viscose and 41 cc/minute of polyethylene glycol. The cellulose solids in the combined modified viscose was 7.31 percent and total solids including the polyethylene oxide was about 8.84 percent. After regeneration it was found that about 50% of the polyethylene oxide washed out during processing. The resulting casing was stuffed with sausage meat and was found to have good meat release characteristics when compared with the standard casing above.

EXAMPLE 4

Example 3 was repeated except that the polyethylene glycol used had an average molecular weight of about 8,000. It was found that little, if any, of the polyethylene glycol was washed from the casing during processing and that meat release characteristics continued to be good.

EXAMPLE 5

Food casings manufactured in accordance with Examples 3 and 4 were compared for various properties. The results are shown in Table 1.

TABLE 1

|  | Example 2 (control) | Example 3 20% PEG 4000 | Example 4 20% PEG 8000 |
| --- | --- | --- | --- |
| Conditioned Burst Pressure | 111 Cm Hg | 97 Cm Hg | 94 Cm Hg |
| Conditioned Burst Diameter | 28 mm | 31 mm | 31 mm |
| Rewet Burst Pressure | 33 Cm Hg | 34 Cm Hg | 33 Cm Hg |
| Rewet Burst Diameter | 35 mm | 37 mm | 35 mm |
| Thickness Conditioned/Wet | 0.03/0.05 mm | 0.035/0.08 mm | 0.035/0.07 mm |
| Gel Swell | 58% | 68% | 68% |
| Total Sulfur | 1600 ppm | 1400 ppm | 1300 ppm |
| Permeation Constant (Q units)* | 150 | 300 | 300 |

*Q units = $\frac{(mg/min)\mu m}{(g/ml)cm^2}$

What is claimed is:

1. A cellulose food casing which can be peeled from food product contained therein without damaging said food product, said food casing having a regenerated cellulose internal layer comprising a regenerated viscose containing from 0.1 to 30 percent, by weight of cellulose, of polyalkylene glycol having a molecular weight of from 300 to 20,000.

2. The food casing of claim 1 wherein the polyalkylene glycol is present in the layer in an amount of from 0.1 to 20 percent and has a molecular weight of from 1,000 to 15,000 and is water soluble.

3. The food casing of claim 2 wherein the polyalkylene glycol has the formula $H(OCH_2\text{-}CH_2)_nOH$ wherein n is an integer of from 10 to 400.

4. The food casing of claim 3 wherein n is from 30 to 300.

5. The food casing of claim 1 wherein the polyalkylene glycol is polyethylene glycol.

6. The food casing of claim 2 wherein the food casing is reinforced with a fiber web and has a cellulose interior layer regenerated from viscose containing polyalkylene glycol extruded onto the fiber web at the time the food casing is formed.

7. A method for the manufacture of the food casing of claim 1 wherein said casing is fiber reinforced, said method comprising shaping a fiber web into the shape of a tube having an interior and exterior surface, extruding viscose onto each of the surfaces, at least the viscose extruded onto the interior surface containing from 0.2 to 20 percent polyalkylene glycol having a molecular weight of from 300 to 15,000 and regenerating cellulose from the viscose to form the casings.

8. A method for the manufacture of the food casing of claim 1 wherein said casing is fiber reinforced, said method comprising shaping a fiber web into the shape of a tube having an interior and exterior surface, extruding viscose onto each of the surfaces, at least the viscose extruded onto the interior surface containing from 1 to 15 percent polyalkylene glycol having a molecular weight of from 1000 to 10,000 and regenerating cellulose from the viscose to form the casing.

* * * * *

UNITED STATES PATENT AND TRADEMARK OFFICE
CERTIFICATE OF CORRECTION

PATENT NO. : 5,449,318

DATED : September 12, 1995

INVENTOR(S) : John J. Halftown et al.

It is certified that error appears in the above-identified patent and that said Letters Patent is hereby corrected as shown below:

Column 2, line 27, after the word "Application", and before the word "discloses", insert "0,559,456 A1".

Signed and Sealed this

Second Day of March, 1999

Attest:

Q. TODD DICKINSON

*Attesting Officer*  *Acting Commissioner of Patents and Trademarks*